US008402641B2

(12) United States Patent
Johnson et al.

(10) Patent No.: US 8,402,641 B2
(45) Date of Patent: Mar. 26, 2013

(54) APPARATUS FOR CONNECTING CONDUCTORS USING A WEDGE CONNECTOR

(75) Inventors: Barry Johnson, Ontario (CA); Dmitry Ladin, Ontario (CA); Randy Cole, Ontario (CA)

(73) Assignee: Tyco Electronics Corporation, Middletown, PA (US)

( * ) Notice: Subject to any disclaimer, the term of this patent is extended or adjusted under 35 U.S.C. 154(b) by 1205 days.

(21) Appl. No.: 12/190,788

(22) Filed: Aug. 13, 2008

(65) Prior Publication Data

US 2008/0295322 A1 Dec. 4, 2008

Related U.S. Application Data

(62) Division of application No. 11/405,279, filed on Apr. 17, 2006, now Pat. No. 7,426,782.

(51) Int. Cl.
*B23P 19/00* (2006.01)

(52) U.S. Cl. ................. 29/745; 29/748; 29/751; 29/753

(58) Field of Classification Search .................... 29/745, 29/748, 751, 753
See application file for complete search history.

(56) References Cited

U.S. PATENT DOCUMENTS 2,560,411 A * 7/1951 Burns ............................ 29/459
2,799,108 A 7/1957 Kopf et al.
2,972,746 A 2/1961 Skumawitz
3,216,140 A 11/1965 Termet
3,235,944 A * 2/1966 Broske et al. .................. 29/872
3,257,499 A * 6/1966 Broske ....................... 174/94 R
3,345,454 A 10/1967 Mixon
3,387,080 A * 6/1968 Dibble et al. ............... 174/94 R
3,515,794 A 6/1970 Beinhaur et al.
3,563,439 A 2/1971 Pomeroy
3,681,512 A 8/1972 Werner et al.
3,742,582 A 7/1973 Broske
3,761,602 A 9/1973 De Sio et al.
3,826,860 A 7/1974 De Sio et al.
4,252,992 A 2/1981 Cherry et al.
4,279,461 A * 7/1981 Bussen et al. ................. 439/783
4,650,273 A * 3/1987 Roosdrop .................... 439/783

(Continued)

FOREIGN PATENT DOCUMENTS

DE 1146459 3/1963
EP 0 477 934 A1 1/1992

(Continued)

OTHER PUBLICATIONS

AMP Miniwedge Connectors, 83447-[ ], 83592-[ ], 83623-[ ], 83631-[ ], Instruction Sheet 408-9858, Sep. 26, 1994, AMP Incorporated, Harrisburg, PA 17105, 3 pages.

(Continued)

*Primary Examiner* — Carl Arbes
(74) *Attorney, Agent, or Firm* — Myers Bigel Sibley & Sajovec, PA

(57) ABSTRACT

A connector system for connecting first and second elongate conductors includes a wedge connector and a hydraulic power drive tool assembly. The wedge connector includes: a sleeve member defining a sleeve cavity and mountable on the first and second conductors; a wedge member; and a lubricant coating disposed on at least one of the sleeve member and the wedge member. The hydraulic power drive tool assembly is adapted to drive the wedge member into the sleeve cavity when the sleeve member is mounted on the first and second conductors to secure the wedge connector to each of the first and second conductors. According to some embodiments, the lubricant is a wax.

17 Claims, 4 Drawing Sheets

U.S. PATENT DOCUMENTS

| | | | | | |
|---|---|---|---|---|---|
| 4,705,200 | A | | 11/1987 | Kopf et al. | |
| 4,722,189 | A | | 2/1988 | Center | |
| 4,723,921 | A | * | 2/1988 | Pooley | 439/783 |
| 4,730,087 | A | * | 3/1988 | Werner | 174/94 S |
| 4,752,252 | A | | 6/1988 | Cherry et al. | |
| RE33,098 | E | | 10/1989 | Center | |
| 4,905,603 | A | | 3/1990 | McBain | |
| 4,945,730 | A | | 8/1990 | Laney | |
| 5,090,923 | A | | 2/1992 | Kenyon et al. | |
| 5,092,797 | A | * | 3/1992 | Cole et al. | 439/783 |
| 5,111,681 | A | | 5/1992 | Yasui et al. | |
| 5,195,042 | A | | 3/1993 | Ferraro et al. | |
| 5,195,354 | A | | 3/1993 | Yasui et al. | |
| 5,239,829 | A | | 8/1993 | Blake | |
| 5,244,422 | A | | 9/1993 | Laricchia | |
| 5,477,680 | A | | 12/1995 | Heskey et al. | |
| 5,538,447 | A | | 7/1996 | Chadbourne et al. | |
| 5,553,478 | A | | 9/1996 | Di Troia | |
| 5,580,284 | A | * | 12/1996 | Laricchia | 439/783 |
| 5,600,096 | A | | 2/1997 | Cherry et al. | |
| 5,683,273 | A | | 11/1997 | Garver et al. | |
| 5,692,930 | A | * | 12/1997 | Garver et al. | 439/781 |
| 5,774,987 | A | | 7/1998 | Chadbourne et al. | |
| 5,794,334 | A | | 8/1998 | Chadbourne et al. | |
| 5,862,589 | A | | 1/1999 | Chadbourne et al. | |
| 6,085,422 | A | | 7/2000 | Hirabayashi | |
| 6,093,064 | A | | 7/2000 | Callen et al. | |
| 6,679,340 | B1 | | 1/2004 | Tatai | |
| 6,851,262 | B1 | | 2/2005 | Gregory et al. | |
| 6,895,663 | B2 | | 5/2005 | Itrich | |
| 2004/0029455 | A1 | | 2/2004 | Johnson et al. | |
| 2005/0022528 | A1 | | 2/2005 | Gregory et al. | |
| 2005/0081524 | A1 | | 4/2005 | Gregory et al. | |

FOREIGN PATENT DOCUMENTS

| | | | |
|---|---|---|---|
| EP | 1 458 055 | A1 | 9/2004 |
| FR | 1117298 | | 5/1956 |
| FR | 1378478 | | 11/1964 |
| WO | 2004/015815 | A1 | 2/2004 |
| WO | WO 2004/015815 | A1 | 2/2004 |

OTHER PUBLICATIONS

Huskie Tools, Model REC-5510 12 Ton Battery Powered Compression Tool 1.65 Jaw Opening, www.huskietools.com, dated Sep. 27, 2005, 2 pages.

AMP MINIWEDGE Connector Hand Tool 217330-1, Instruction Sheet 408-4095, Jan. 13, 1995, AMP Incorporated, Harrisburg, PA 17105, 4 pages.

AMP MINIWEDGE Connectors, 83447-[ ], 83692-[ ], 83623-[ ], 83631-[ ], Instruction Sheet 408-9858, Sep. 26, 1994, AMP Incorporated, Harrisburg, PA 17105, 3 pages.

AMPACT HTT Product Description, admitted prior art, 1 page (Jan. 1, 2003).

Customer Manual, *AMPACT Taps, Stirrups, and Application Tooling*, 409-2106, Rev M, Feb. 5, 1999, 39 pages.

Huskie Tools, Model REC-5510 12 Ton Battery Powered Compression Tool 1.65" Jaw Opening, www.huskietools.com, dated Sep. 27, 2005, 2 pages.

Sermagard® Protective Coatings Product Description, admitted prior art, 1 page (Jan. 1, 2005).

Declaration of Barry Johnson under 37 C.F.R. 1.132, including Exhibits A and B, dated Aug. 10, 2006.

PCT Search Report for PCT/US2007/009384, mailed Aug. 10, 2007.

Written Opinion for PCT/US2007/009384, mailed Aug. 10, 2007.

* cited by examiner

APPARATUS FOR CONNECTING CONDUCTORS USING A WEDGE CONNECTOR

RELATED APPLICATION(S)

The present application is a divisional application of and claims priority from U.S. patent application Ser. No. 11/405,279, filed Apr. 17, 2006 now U.S. Pat. No. 7,426,782, the disclosure of which is hereby incorporated herein by reference in its entirety.

FIELD OF THE INVENTION

The present invention relates to tools and methods for using tools and, more particularly, to apparatus and methods for securing or terminating connectors.

BACKGROUND OF THE INVENTION

Electrical cables often must be terminated or joined in various environments, such as underground or overhead. Such cables may be, for example, high voltage electrical distribution or transmission lines. In order to form such connections, a connector may be employed. To install such connectors, it may be necessary to force two members into engagement, typically such that one or both of the members are deformed. For example, in electrical power systems, it is occasionally necessary to tap into an electrical power line. One known system for tapping into an electrical power line is to use a tap connector for electrically connecting a main line electrical cable to an end of a tap line electrical cable. One such tap connector, typically referred to as a wedge connector, includes an electrically conductive C-shaped member or sleeve and a wedge. The two cables are positioned at opposite sides of the C-shaped sleeve and the wedge is driven between the two cables. This forces the two cables against the C-shaped sleeve such that they are captured between the wedge and the C-shaped sleeve.

Wedge connectors are commonly installed using an explosively driven connecting tool (sometimes referred to as a powder actuated tool). The C-shaped sleeve is held in place on a tool head connected to a tool body including a cartridge chamber. The cartridge chamber accepts a gunpowder shell casing with a powder charge that is activated by striking the casing with a hammer. The explosion drives a ram that forces the wedge portion of the connector between the two cables. The high velocity of the wedge prevents the cables from "bird caging." The cables tend to bird cage if the speed of the ram is slowed down. This may result in the connection not being properly made electrically and damage to the conductor strands, and may cause an aesthetic concern with the appearance of the distorted conductor. Some conductor strands may be pulled ahead of others, creating bulging at a point along the cable. Such bulging may allow corrosive elements to more easily penetrate between the open conductor strands and deteriorate the conductor more quickly. Such bulging may also lead to increased operating temperature and thereby an increase in electrical resistance.

SUMMARY OF THE INVENTION

According to embodiments of the present invention, a method for connecting first and second elongate conductors using a wedge connector includes: providing a wedge connector including a sleeve member, a wedge member, and a lubricant coating disposed on at least one of the sleeve member and the wedge member, the sleeve member defining a sleeve cavity; mounting the sleeve member on the first and second conductors; and driving the wedge member into the sleeve cavity using a hydraulic power drive tool assembly to secure the wedge connector to each of the first and second conductors. According to some embodiments, driving the wedge member into the sleeve cavity includes driving the wedge member into the cavity using the hydraulic power drive tool assembly at a rate of no more than about 12 inches per second. According to some embodiments, the lubricant is a wax.

According to further embodiments of the present invention, a method for connecting first and second elongate conductors using a wedge connector includes: providing a wedge connector including a sleeve member, a wedge member, and a lubricant coating disposed on at least one of the sleeve member and the wedge member, the sleeve member defining a sleeve cavity; mounting the sleeve member on the first and second conductors; and driving the wedge member into the sleeve cavity using a power drive tool assembly to secure the wedge connector to each of the first and second conductors; wherein driving the wedge member into the sleeve cavity includes driving the wedge member into the cavity using the power drive tool assembly at a rate of no more than about 12 inches per second.

According to further embodiments of the present invention, a connector system for connecting first and second elongate conductors includes a wedge connector and a hydraulic power drive tool assembly. The wedge connector includes: a sleeve member defining a sleeve cavity and mountable on the first and second conductors; a wedge member; and a lubricant coating disposed on at least one of the sleeve member and the wedge member. The hydraulic power drive tool assembly is adapted to drive the wedge member into the sleeve cavity when the sleeve member is mounted on the first and second conductors to secure the wedge connector to each of the first and second conductors. According to some embodiments, the lubricant is a wax.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
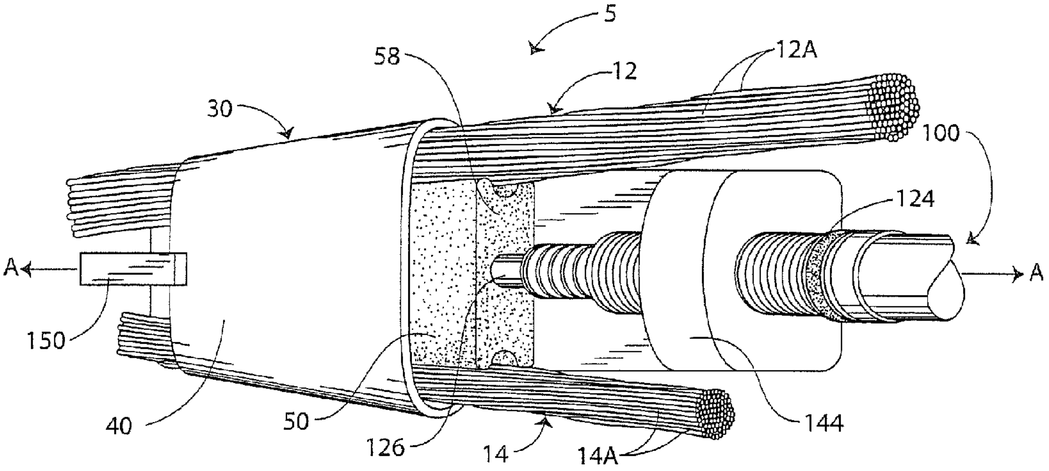
FIG. 1 is a fragmentary, perspective view of a connector system according to some embodiments of the present invention and a pair of conductors.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being “coupled” or “connected” to another element, it can be directly coupled or connected to the other element or intervening elements may also be present. In contrast, when an element is referred to as being “directly coupled” or “directly connected” to another element, there are no intervening elements present. Like numbers refer to like elements throughout.

In addition, spatially relative terms, such as “under”, “below”, “lower”, “over”, “upper” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “under” or “beneath” other elements or features would then be oriented “over” the other elements or features. Thus, the exemplary term “under” can encompass both an orientation of over and under. The device may be otherwise oriented (rotated 90 degrees or at other orientations) and the spatially relative descriptors used herein interpreted accordingly.

The thickness of layers or coatings may be exaggerated in the drawings for clarity.

Figure 2:
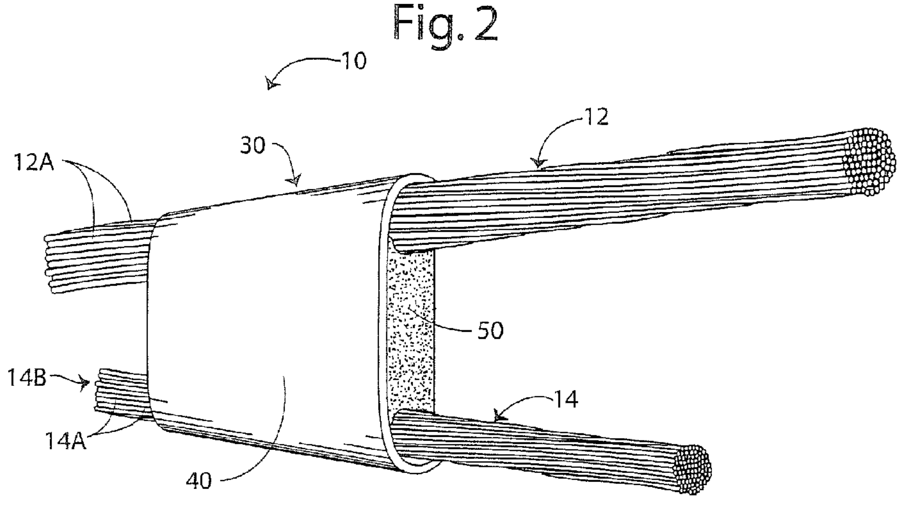
FIG. 2 is a fragmentary, perspective view of a connection formed by the connector system of FIG. 1 and in accordance with some embodiments of the present invention.

With reference to FIGS. 1 and 2, methods and a connector system 5 according to embodiments of the present invention may be used to form a connection 10. The connection 10 includes a pair of elongate cables or conductors 12, 14 mechanically and electrically coupled by a wedge connector 30. The conductors 12, 14 each include a plurality of separable elongate strands 12A, 14A. Alternatively, one of the conductors 12, 14 may be solid. The connector system 5 includes the connector 30 and a hydraulic power drive tool assembly 100. The connector 30 includes a C-shaped member or sleeve 40 and a wedge member 50. Generally, and as described in more detail below, the drive tool assembly 100 may be used to force or impel the wedge member 50 and the sleeve 40 into engagement about the conductors 12, 14. In accordance with embodiments of the present invention, a lubricant coating 58 is provided on the connector 30 and serves to reduce or prevent “bird caging” of the conductors 12, 14.

Figure 3:
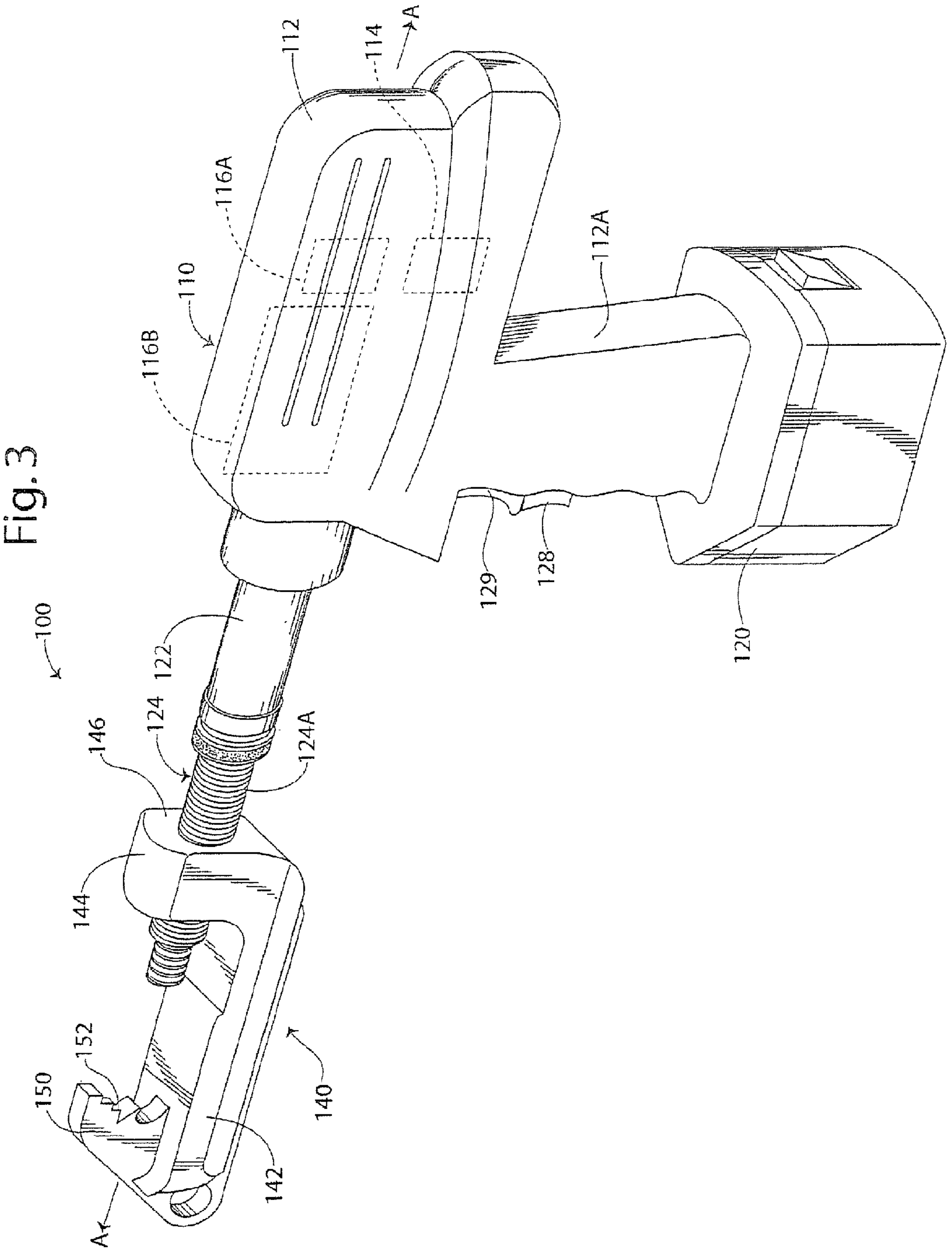
FIG. 3 is a perspective view of a hydraulic power tool drive assembly forming a part of the connector system of FIG. 1.

Turning to the hydraulic power drive tool assembly 100 in more detail, the drive tool assembly 100 includes a drive unit 110 and a tool head 140. The drive unit 110 includes a housing 112 having a handle 112A. An electric motor 114, a hydraulic pump 116A, and a hydraulic circuit 116B (each shown schematically in FIG. 3) are housed in the housing 112. A rechargeable battery 120, which may be provided as a battery pack unit, is removably and replaceably mounted on the handle 112A. A sleeve 122 extends forwardly from the housing 112. An adapter 124 is secured to the forward end of the sleeve 122 and has threads 124A. A ram 126 (FIG. 1) is slidably mounted in the sleeve 122. A trigger 128 is provided for selectively controlling actuation of the drive unit 110. A second trigger 129 is provided to retract the ram 126.

In operation, the operator may actuate the drive unit 110 by pressing the trigger 128. In response, the electric motor 114, powered by the battery 120, drives the pump 116A, which in turn pressurizes the hydraulic circuit 116B. The pressurized hydraulic circuit 116B forceably drives or displaces the ram 126 forwardly along a stroke axis A-A. For example, the hydraulic circuit 116B may include a hydraulic cylinder associated with the ram 126. The driving of the ram 126 may be stopped automatically (e.g., responsive to a pressure sensor, a travel distance sensor, etc.) and/or by releasing the trigger 128. The ram 126 may thereafter be retracted by pressing the second trigger 129.

According to some embodiments of the present invention, the drive unit 110 produces a force via the ram 126 of at least about 1 metric ton. According to some embodiments, the force is between about 1 metric ton and 8 metric tons. According to some embodiments, the stroke length of the ram 126 is at least about 0.25 inch and, according to some embodiments, is between about 0.25 inch and 2.5 inches.

The drive unit 110 may be constructed in any suitable manner. Suitable drive units for use as the drive unit 110 may include the drive unit portions of the hydraulic compression tools and cutting tools of the ROBO CRIMP™ line of tools from Huskie Tools of Illinois. For example, according to some embodiments, the drive unit 110 may be a Huskie Tools ROBO CRIMP™ model no. REC-MDT drive unit. According to some embodiments, the battery 120 is a rechargeable 14.4 volt battery.

The tool head 140 may be constructed in the same manner as the tool heads commonly employed with powder actuated tools for installing wedge-type connectors, for example. The tool head 140 includes a body 142, a mount portion 144 on the rear end of the body 142, and a brace portion or abutment 150 on the front end of the body 142. A threaded bore 146 extends through the mount portion 144. A lance portion 152 projects from the rear face of the brace portion 150 and defines a notch above the lance portion 152. The body 142, the mount portion 144, and the brace portion 150 define a cradle cavity for receiving the C-shaped sleeve 40 and the wedge 50. The threaded bore 146 threadedly receives the threads 124A of the adapter 124 to removably mount the tool head 140 on the drive unit 110.

The tool head 140 may be formed using any suitable construction and materials. According to some embodiments, the tool head 140 is formed of metal. According to some embodiments, the tool head 140 is formed of steel.

Figure 4:
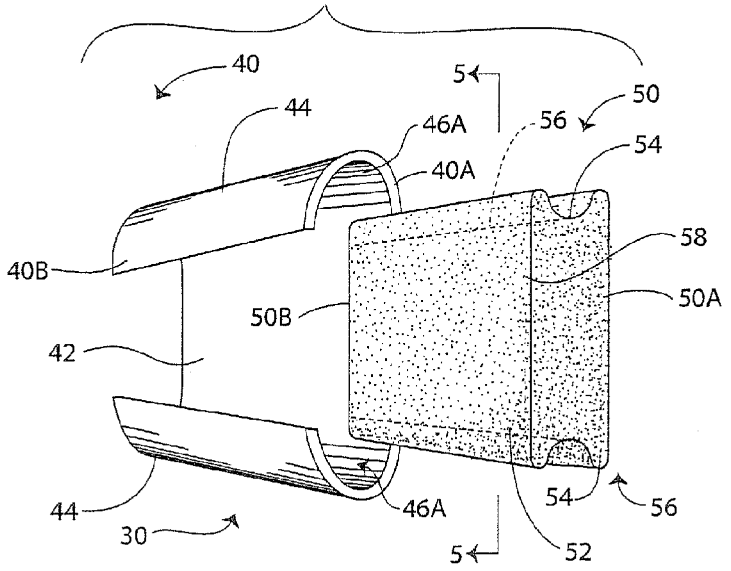
FIG. 4 is an exploded, perspective view of a wedge connector forming a part of the connector system of FIG. 1.

With reference to FIG. 4, the C-shaped sleeve 40 includes a body 42 and a pair of arcuate side walls 44 extending along the opposed side edges of the body 42. The sleeve 40 defines a cavity 46 including opposed, concave side channels 46A. The sleeve 40 tapers inwardly from a rear end 40A to a front end 40B. More particularly, the side channels 46A taper inwardly or converge from the rear end 40A to the front end 40B.

The C-shaped sleeve 40 may be formed of any suitable material. According to some embodiments, the sleeve 40 is formed of metal. According to some embodiments, the sleeve 40 is formed of aluminum or copper alloy. The sleeve 40 may be formed using any suitable technique. According to some embodiments, the sleeve 40 is stamped (e.g., die-cut), formed, machined and/or cast.

Figure 5:
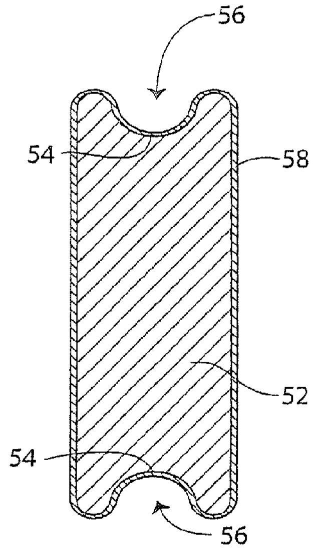
FIG. 5 is a cross-sectional view of a wedge member forming a part of the wedge connector of FIG. 4 taken along the line 5-5 of FIG. 4.

With reference to FIGS. 4 and 5, the wedge member 50 includes a body 52 having opposed, arcuate side walls 54. The side walls 54 define opposed, concave grooves or channels 56. The wedge member 50 tapers inwardly from a rear end 50A to a front end 50B. The wedge member 50 may be formed of any suitable material. According to some embodiments, the wedge member 50 is formed of metal. According to some embodiments, the wedge member 50 is formed of aluminum or copper alloy. The wedge member 50 may be formed using any suitable technique. According to some embodiments, the wedge member 50 is cast and/or machined.

Except as otherwise described herein, the C-shaped sleeve 40 and the wedge member 50 may be a C-shaped sleeve and/or a wedge member as sold by Tyco Electronics Corporation of Pennsylvania under the trademark AMPACT™, EXCLTAP™, or MINIWEDGE™.

With reference to FIGS. 4 and 5, the lubricant coating 58 coats the arcuate side walls 54 of the wedge member 50. According to some embodiments, the lubricant coating 58 coats substantially the entirety of the arcuate side walls 58. The lubricant coating 58 may also coat other parts of the wedge member 50. According to some embodiments and as illustrated, the lubricant coating 58 coats substantially the entirety of the wedge member 50. The lubricant coating may also coat surfaces of the C-shaped sleeve 40, including the interior surfaces of the side walls 44.

The lubricant coating 58 is selected or formulated such that it provides the lubricating performance described herein, but nonetheless permits a sufficient mechanical engagement between the conductors 12, 14 and the connector 30 to provide a satisfactorily mechanically strong connection 10. According to some embodiments, the lubricant coating 58 does not significantly negatively affect the electrical performance of the connection 40.

The lubricant coating 58 may be formed of any suitable material. According to some embodiments, the lubricant coating 58 is a dry film lubricant that is solid at least up to a temperature of about 25° C. and, according to some embodiments, up to a temperature of at least about 50° C. According to some embodiments, the lubricant includes a dry film wax lubricant. According to some embodiments, the lubricant coating 58 is a synthetic wax and, according to some embodiments, a polyethylene wax lubricant. According to some embodiments, the lubricant coating 58 has a coefficient of friction in the range of from about 0.089 to 0.107 at 25° C. According to some embodiments, the lubricant coating 58 is a wax having a melting point of at least 25° C. and, according to some embodiments, at least 50° C. According to some embodiments, the lubricant coating 58 is substantially free of abrading particles. Suitable lubricants for the lubricant coating 58 may include Sermalube 1127 dry film wax lubricant available from SermaGard Coatings of Limerick, Pa.

According to some embodiments, the lubricant coating 58 has a nominal thickness on the arcuate side walls 54 of at least about 0.030 inch. According to some embodiments, the nominal thickness of the lubricant coating 58 on the side walls 54 is between about 0.030 and 0.120 inch.

According to some embodiments of the present invention, the lubricant coating 58 is pre-applied to the side walls 54 and/or the other appropriate surfaces (e.g., the side walls 44) in the factory (i.e., during manufacture of the connector 30). According to some embodiments, the wedge member 50 is dipped in a bath of the lubricant; thereafter, the lubricant is cured and dried on the wedge member 50. According to some embodiments, the lubricant is a wax, and a waterborne dispersion of the wax is applied to the wedge member 50 and the water component is permitted to evaporate, leaving a dry film layer of the wax on the wedge member 50. Factory installation of the lubricant on the connector 30 may be important to ensure that the lubricant is properly cured, thereby ensuring consistent and proper performance and handling characteristics. However, it is also contemplated that in accordance with some embodiments, the lubricant coating 58 can be applied in the field by the installer in place of or in addition to factory application.

With reference to FIGS. 1 and 2, the connector system 5 can be used as follows in accordance with method embodiments of the present invention. The C-shaped sleeve 40 is placed over the conductor 12 such that the conductor 12 is received in one side channel 46A. The conductor 14 is placed in the other side channel 46A. As shown in FIG. 1, the wedge member 50 is partially inserted into the cavity 46 of the sleeve 40 between the conductors 12, 14 such that the conductors 12, 14 are received in the opposed grooves 56. The wedge member 50 may be forced into the sleeve 40 by hand or using a hammer or the like to temporarily hold the wedge member 50 and the conductors 12, 14 in position.

The hydraulic power drive tool assembly 100 is then mounted on the sleeve 40 and the wedge member 50 such that the sleeve 40 and the wedge member 50 are positioned in the cradle cavity as shown in FIG. 1. The front end 40B of the sleeve 40 is received in the notch above the lance portion 152 and the rear end 50A of the wedge member 50 is positioned proximate the ram 126.

The drive unit 110 is then actuated by pressing the trigger 128 to drive the ram 126 forward, thereby forcing the wedge member forwardly relative to the sleeve 40. The ram 126 continues to advance the wedge member 50 until the wedge member 50 is in a desired final position to form the connection 10 as shown in FIG. 2. The connection 10 may be formed by forming interference fits between the wedge member 50, the C-shaped sleeve 40 and the conductors 12, 14. The wedge member 50, the sleeve 40 and/or the conductors 12, 14 may be deformed. The C-shaped sleeve 40 may be elastically deformed so that it applies a bias or spring force against the wedge member 50 and the conductors 12, 14. The sleeve 40 may be plastically deformed. The drive unit 110 may be deactuated by releasing the trigger 128, operating a pressure sensitive switch or the like. The ram 126 can be retracted by pressing the second trigger 129.

Figure 2A:
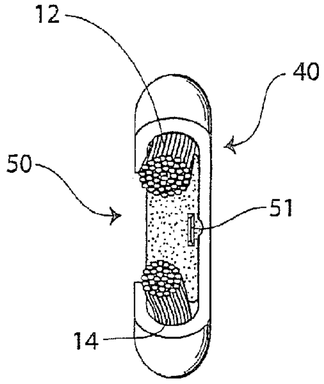
FIG. 2A is an end view of the connection of FIG. 2.

As the wedge member 50 is driven forward into the sleeve 40, the lance portion 152 deflects and deforms (i.e., splits) an end portion of the wedge member 50 so that a lock tab 51 (FIG. 2A) projects outwardly in front of the front edge of the sleeve 40. The lock tab 51 thereby cooperates with the front edge of the sleeve 40 to prevent or inhibit withdrawal of the wedge member 50 from the sleeve 40.

During the foregoing installation process, the wedge member 50 may be advanced by the drive unit 110 relatively slowly relative to the sleeve 40 and the conductors 12, 14. Such slow insertion may generally tend to induce "bird caging" in the conductor 12 and/or the conductor 14. That is, friction between the wedge member 50 and the conductor 12 and/or the conductor 14 may tend to pull or slide some strands 12A, 14A of the conductors 12, 14 (typically the strands 12A, 14A engaging or nearer the wedge member 50) forward relative to the sleeve 40 and/or other strands 12A, 14A of the same or the other conductor 12, 14. The conductor 14 may be particularly prone to bird caging because its forward end 14B (FIG. 2) is free. Bird caging may result in an improper or unreliable connection. However, in the case of the present invention, the lubricant coating 58 serves to reduce or eliminate such friction, thereby reducing or preventing such bird caging.

The methods and apparatus in accordance with embodiments of the present invention may provide the advantages of relatively slow actuation power tools while mitigating or eliminating drawbacks that would otherwise be experienced with such tools in installing a wedge-type connector (e.g., the connector 30). Battery operated tools in particular may provide a number of advantages over some explosive actuated tools, including improvements in simplicity, safety, speed, reduction in training requirements, environmental impact, ergonomics, and cost savings. Battery operated tool may also be employed in countries, environments and applications where use of explosives is limited.

The lubricant coating may reduce the force required to install the connector. In this way, the lubricant coating may reduce the stress, fatigue, etc. on the tool assembly (especially the tool head) caused by installation forces, thereby extending the service life of the tool assembly. The lubricant coating may provide corrosion resistance to the connector and/or the conductors.

According to some embodiments, during insertion of the wedge member 50, the ram 126 is advanced forwardly along the stroke axis A-A at a rate of no more than 12 inches per second. According to some embodiments, the ram 126 is advanced at a rate of no more than 1 inch per second. According to some embodiments, the ram 126 is advanced at a rate of between about 0.125 and 12 inches per second.

Methods and connectors in accordance with embodiments of the present invention can be used with other types of power drivers. In particular, lubricated connectors of the present invention may be used with other relatively slow moving drive units (e.g., those providing an insertion rate of less than about 12 inches per second). The lubricated connectors of the present invention may be applied using lower power/lower speed powder actuated tools as well.

The conductors 12, 14 can be of different sizes. One of the conductors 12, 14 may be replaced with a bar, stirrup or the like. According to some embodiments, the conductor 12 is a main line electrical cable and the conductor 14 is a tap line electrical cable.

According to some embodiments, the conductors 12, 14 have a diameter of from about 0.10 to 2 inches. According to some embodiments, the conductors 12, 14 each have a diameter of from about 0.125 to 1 inch.

While, in accordance with some embodiments of the invention, the sleeve member is C-shaped, suitable sleeve members of other configurations may be employed.

According to some embodiments, the lubricant does not significantly affect the connector's electrical performance.

According to some embodiments, the connector 30 is further coated with an oxidation or corrosion inhibitor compound. The inhibitor compound may include an abrasive powder or grit dispersed in a base oil. According to some embodiments, the grit is electrically conductive and, according to some embodiments, includes nickel and aluminum grit. The inhibitor compound may be a paste or have a paste-like consistency. In use, the inhibitor compound may serve to remove oxidation and inhibit or prevent the formation of new oxidation on the connector 30 and/or the cables. More particularly, the grit may scrape away oxidation from the cables to expose cable metal (e.g., aluminum) for improved electrical contact with the sleeve 40 and/or the wedge 50, and the base oil may coat the connection to inhibit oxidation (due to exposure to air) of the metal exposed by the scraping action. Suitable inhibitor compounds may include AMPACT Inhibitor, Miniwedge Inhibitor, or AMPACT HT Inhibitor compounds available from Tyco Electronics, Incorporated.

According to some embodiments, the lubricant coating 58 is applied to the connector 30 (e.g., to the side walls 54 of the wedge member 50) as described above, and the inhibitor compound is applied over the lubricant coating 58 (e.g., by brushing, spraying or extruding). As discussed above, the lubricant coating 58 may be a dry film coating (e.g., a wax) that is solid at least up to a temperature of 25° C., so that a two-layer coating system is provided. According to some embodiments, the two layers are sufficiently distinct that the grit of the inhibitor compound is substantially fully separated from contacting the surfaces of the connector 30 covered by the lubricant coating 58. According to some embodiments, the lubricant coating 58 is provided on the wedge member contact surfaces 54 but not on the inner surfaces of the sleeve side walls 44, and the inhibitor compound is provided on the inner surfaces of the sleeve side walls 44 and also on the lubricant coating 58 over the wedge member contract surfaces 54.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A connector system for connecting first and second elongate conductors, the connector system comprising:

a) a wedge connector including:
  - a sleeve member defining a sleeve cavity and mountable on the first and second conductors;
  - a wedge member; and
  - a lubricant coating disposed on at least one of the sleeve member and the wedge member; and b) a hydraulic power drive tool assembly adapted to drive the wedge member into the sleeve cavity when the sleeve member is mounted on the first and second conductors to secure the wedge connector to each of the first and second conductors;

wherein the lubricant is adapted to reduce friction between at least one of the first and second conductors and the at least one of the sleeve member and the wedge member.

2. The connector system of claim 1 wherein the hydraulic power drive tool assembly is adapted to drive the wedge member into the sleeve cavity at a rate of no more than about 12 inches per second.

3. The connector system of claim 1 wherein the hydraulic power drive tool assembly includes:

a tool head adapted to receive the sleeve member; and a ram, wherein the hydraulic power drive tool assembly is adapted to forcibly extend the ram to drive the wedge member into the sleeve cavity when the sleeve member is mounted in the tool head.

4. The connector system of claim 1 wherein the hydraulic power drive tool assembly includes an electric motor to drive the wedge member into the sleeve cavity and a battery to power the electric motor.

5. The connector system of claim 1 wherein the lubricant is a wax.

6. The connector system of claim 1 wherein the lubricant has a nominal thickness in the range of from about 0.030 to 0.120 inch.

7. The connector system of claim 1 wherein the wedge member has opposed side walls adapted to engage the first and second conductors and the lubricant coating is disposed on the side walls of the wedge member.

8. The connector system of claim 1 wherein the sleeve member and the wedge member are each formed of metal.

9. The connector system of claim 1 wherein:

the sleeve member includes first and second opposed side walls each defining a sleeve channel;

the wedge member includes first and second opposed side walls each defining a wedge channel; and the sleeve member and the wedge member are configured to capture the first and second conductors such that the first conductor is received in the first sleeve channel and the first wedge channel and the second conductor is received in the second sleeve channel and the second wedge channel.

10. The connector system of claim 9 wherein the lubricant coating is disposed on the side walls of the wedge member.

11. The connector system of claim 9 wherein the sleeve member is C-shaped.

12. The connector system of claim 1 further including an oxide inhibitor compound coating at least one of the wedge member and the sleeve member.

13. The connector system of claim 1 wherein:

the sleeve member includes a side wall defining a sleeve channel;

the wedge member includes a side wall defining a wedge channel; and the sleeve member and the wedge member are configured to capture the first conductor such that the first conductor is received in the sleeve channel and the wedge channel;

wherein the lubricant coating is disposed on the side wall of the wedge member.

14. The connector system of claim 13 wherein there is no lubricant coating the side wall of the sleeve member.

15. The connector system of claim 13 wherein the wedge connector further includes an oxide inhibitor compound coating the lubricant coating disposed on the side wall of the wedge member.

16. The connector system of claim 15 wherein the oxide inhibitor compound includes grit, and the grit is substantially fully separated from the side wall of the wedge member by the lubricant coating disposed on the side wall of the wedge member.

17. The connector system of claim 15 wherein the wedge connector further includes a second oxide inhibitor compound directly coating the side wall of the sleeve member.

* * * * *